United States Patent
Jan et al.

(10) Patent No.: US 10,992,036 B2
(45) Date of Patent: Apr. 27, 2021

(54) PORTABLE COMMUNICATION DEVICE AND ANTENNA DEVICE WITH REMOVEABLE MATCHING CIRCUIT

(71) Applicant: MOTOROLA SOLUTIONS, INC., Chicago, IL (US)

(72) Inventors: Peter Christopher Jan, Butterworth (MY); Lee Huang Ng, Bayan Lepas (MY); Alexander Oon, Bayan Lepas (MY); Ming Yeh Koh, Bandar Baru Air Itam (MY); Moheinvarman Subramaniam, Batu Ferringhi (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 16/515,595

(22) Filed: Jul. 18, 2019

(65) Prior Publication Data

US 2021/0021026 A1    Jan. 21, 2021

(51) Int. Cl.
| | |
|---|---|
| *H01Q 1/50* | (2006.01) |
| *H01Q 1/08* | (2006.01) |
| *H04B 1/04* | (2006.01) |
| *H01Q 1/24* | (2006.01) |

(52) U.S. Cl.
CPC .............. *H01Q 1/50* (2013.01); *H01Q 1/085* (2013.01); *H01Q 1/244* (2013.01); *H04B 1/0458* (2013.01)

(58) Field of Classification Search
CPC .......... H01Q 1/08; H01Q 1/085; H01Q 1/088; H01Q 1/12; H01Q 1/1242; H01Q 1/244; H01Q 1/50
See application file for complete search history.

(56) References Cited

U.S. PATENT DOCUMENTS

| | | | | |
|---|---|---|---|---|
| 2,886,814 | A | | 5/1959 | Williams |
| 5,604,507 | A | * | 2/1997 | Openlander ............. H01Q 1/50 343/715 |
| 5,835,064 | A | * | 11/1998 | Gomez .................. H01Q 1/242 343/702 |
| 5,856,808 | A | * | 1/1999 | Holshouser ........... H01Q 1/244 343/702 |
| 5,859,617 | A | * | 1/1999 | Fujikawa ............... H01Q 1/244 343/702 |
| 6,005,523 | A | * | 12/1999 | Rudisill ................. H01Q 1/244 343/702 |
| 6,259,411 | B1 | * | 7/2001 | Yanagisawa ........... H01Q 1/085 343/712 |

(Continued)

OTHER PUBLICATIONS

PCT/US2020/042048, Portable Communication Device and Antenna Device With Removeable Matching Circuit, filed Jul. 15, 2020.

*Primary Examiner* — Jason Crawford
(74) *Attorney, Agent, or Firm* — Perry + Currier, Inc.

(57) ABSTRACT

A portable communication device and antenna device with removeable matching circuit is provided. The antenna device includes: a base; an antenna element; an electrical connector at the base; a matching circuit removably positioned between the electrical connector and the antenna element, the electrical connector and the antenna element in electrical communication via the matching circuit; and a shell removably attached to the base, the shell surrounding and protecting the matching circuit. The portable communication device includes the antenna device, for example removably attached to an antenna receptacle.

19 Claims, 5 Drawing Sheets

(56) References Cited

U.S. PATENT DOCUMENTS

| | | | | |
|---|---|---|---|---|
| 6,611,691 B1* | 8/2003 | Zhou | ............... | H01Q 1/244 343/709 |
| 6,642,893 B1* | 11/2003 | Hebron | ............ | H01Q 1/244 343/702 |
| 7,345,648 B2* | 3/2008 | Noro | ............... | H01Q 1/362 343/789 |
| 8,743,009 B2* | 6/2014 | Packer | ............ | H01Q 5/50 343/822 |
| 9,608,318 B2 | 3/2017 | Tan et al. | | |
| 9,666,938 B2* | 5/2017 | Oon | ............... | H01Q 5/357 |
| 10,135,139 B2 | 11/2018 | Contreras et al. | | |
| 2005/0243012 A1* | 11/2005 | Ryou | ............ | H01Q 21/30 343/895 |
| 2006/0063508 A1* | 3/2006 | He | ............ | H03F 3/24 455/341 |
| 2008/0012788 A1* | 1/2008 | Brocheton | ....... | H01Q 23/00 343/906 |
| 2008/0062067 A1 | 3/2008 | Cislo | | |
| 2009/0021445 A1* | 1/2009 | Knudsen | ....... | H01Q 11/083 343/850 |
| 2009/0219220 A1* | 9/2009 | Kersten | ............ | H01Q 5/378 343/860 |
| 2011/0215986 A1* | 9/2011 | Tongue | ............ | H01P 11/00 343/895 |
| 2013/0307735 A1* | 11/2013 | Contreras | ....... | H01Q 11/08 343/702 |
| 2014/0111397 A1* | 4/2014 | Lim | ............ | H01Q 5/20 343/826 |
| 2015/0138037 A1* | 5/2015 | Tan | ............... | H01Q 1/362 343/860 |
| 2016/0013553 A1* | 1/2016 | Contreras | ....... | H01Q 1/085 343/702 |

* cited by examiner

PORTABLE COMMUNICATION DEVICE AND ANTENNA DEVICE WITH REMOVEABLE MATCHING CIRCUIT

BACKGROUND OF THE INVENTION

Some portable communication devices include removeable antenna devices that have multiband capability. However, such multiband capability may result in complicated matching circuits.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
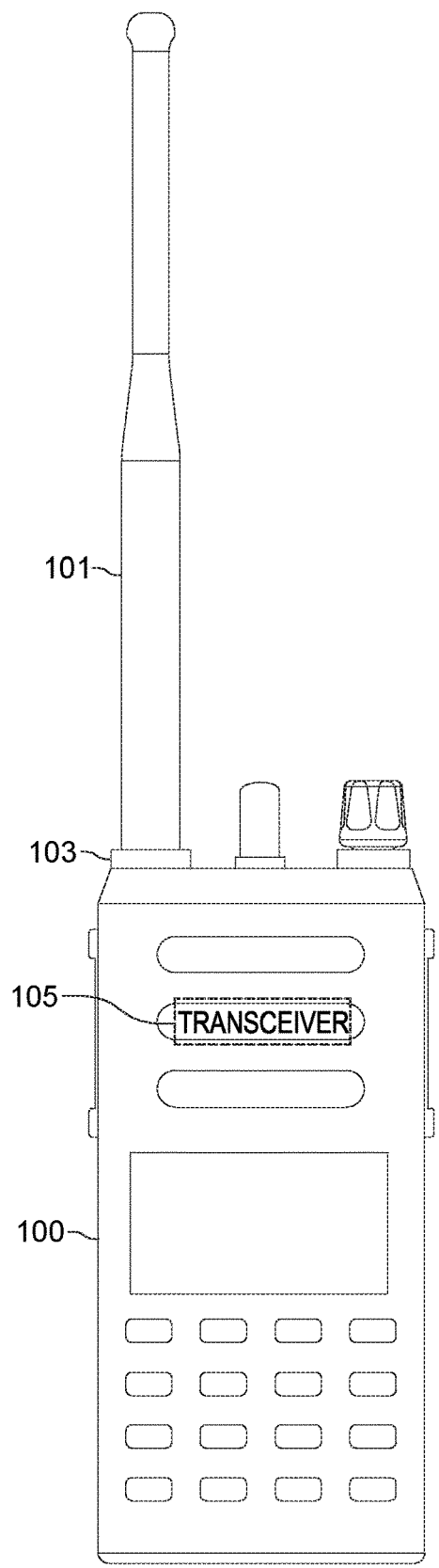
FIG. 1 depicts a portable communication device that includes an antenna device with a removeable matching circuit, in accordance with some examples.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Some portable communication devices include removeable antenna devices that have multiband capability. However, such multiband capability may result in complicated matching circuits. Furthermore, at an antenna device of the present specification, a matching circuit may comprise a printed circuit board (PCB) and/or be mounted on a PCB which, due to the complexity of the matching circuit is longer than a PCB onto which a non-multiband matching circuit may be mounted. As the antenna devices generally should meet a drop test, and as such longer PCBs are more vulnerable to damage and/or failure, the matching circuit of the present specification is removeable and further protected by a removable shell, which may be made of metal, to facilitate easy changing and/or removability of the matching circuit. An antenna element of the antenna device of the present specification may further be flexible, with an intermediate dielectric component between the shell and a flexible form of the antenna element; in particular, the shell may be more rigid that the dielectric component, and the dielectric component may be more rigid than the flexible form.

In particular, an aspect of the present specification provides an antenna device comprising: a base; an antenna element; an electrical connector at the base; a matching circuit removably positioned between the electrical connector and the antenna element, the electrical connector and the antenna element in electrical communication via the matching circuit; and a shell removably attached to the base, the shell surrounding and protecting the matching circuit.

Another aspect of the present specification provides a portable communication device comprising: a housing; a transceiver; an antenna receptacle; and an antenna device comprising: a base removably attached to the antenna receptacle; an antenna element; an electrical connector at the base, the electrical connector in communication with the transceiver; a matching circuit removably positioned between the electrical connector and the antenna element, the electrical connector and the antenna element in electrical communication via the matching circuit; and a shell removably attached to the base, the shell surrounding and protecting the matching circuit.

Attention is directed to FIG. 1, which depicts a perspective view of an example communication device 100 comprising an antenna device 101, an antenna receptacle 103, and a transceiver 105. The communication device 100 is interchangeably referred to hereafter as the device 100. The transceiver 105 is depicted in dotted lines indicating that the transceiver 105 is internal to the device 100.

As depicted, the device 100 comprises a portable communication device such as a land-mobile radio (LMR), for example used by first responders; however, the device 100 may comprise any suitable communication device configured to receive detachable antennas, including, but not limited to, push-to-talk (PTT) radios, citizens broadband radio service (CBRS) radios and the like. However, while the device 100 as depicted is a portable communication device, in other examples the device 100 may not be mobile and/or may be adapted for use in a vehicle.

The antenna device 101 is removably attachable to the device 100 via the antenna receptacle 103 using, for example, a twisting motion to remove and attach the antenna device 101 to the antenna receptacle 103, though any suitable attachment mechanism and corresponding motion for removably attaching the antenna device 101 to the device 100 is within the scope of the present specification. Hence, the antenna receptacle 103 may alternatively be referred to as the corresponding receptacle 103 (e.g., a receptacle corresponding to, and/or configured to receive, the antenna device 101). The transceiver 105 is generally in communication with an antenna element of the antenna device 101 via the antenna receptacle 103 and a base of the antenna device 101 to wirelessly communicate via the antenna element. While not depicted, the antenna device 101 may be one of a plurality of antenna devices that are removably attachable to the device 100, each of the plurality of antenna devices configured to operate at different (or the same) frequency bands, including, but not limited to, a range of about 100 MHz to about 900 MHz, with the transceiver 105 adapted accordingly. However, the antenna device 101 may comprise a multiband antenna device configured to operate over a plurality of bands.

Indeed, the transceiver 105 may comprise one or more of a digital mobile radio (DMR) transceiver, a Project 25 (P25) transceiver, a terrestrial trunked radio (TETRA) transceiver, a Bluetooth transceiver, a Wi-Fi transceiver, for example operating in accordance with an IEEE 802.11 standard (e.g., 802.11a, 802.11b, 802.11g), an LTE (Long-Term Evolution) transceiver and/or other types of GSM (Global System for Mobile communications) transceivers, a Worldwide Interoperability for Microwave Access (WiMAX) transceiver, for example operating in accordance with an IEEE 802.16 standard, and/or another similar type of wireless transceiver configurable to communicate via a wireless radio network. While not depicted, the transceiver 105 may be generally controlled by a processor of the device 100 implementing instructions stored at a computer-readable medium of the device 100, for example to control a frequency range in which the transceiver 105 is to communicate, depending on a frequency range of an antenna device attached to the device 100.

Figure 2:
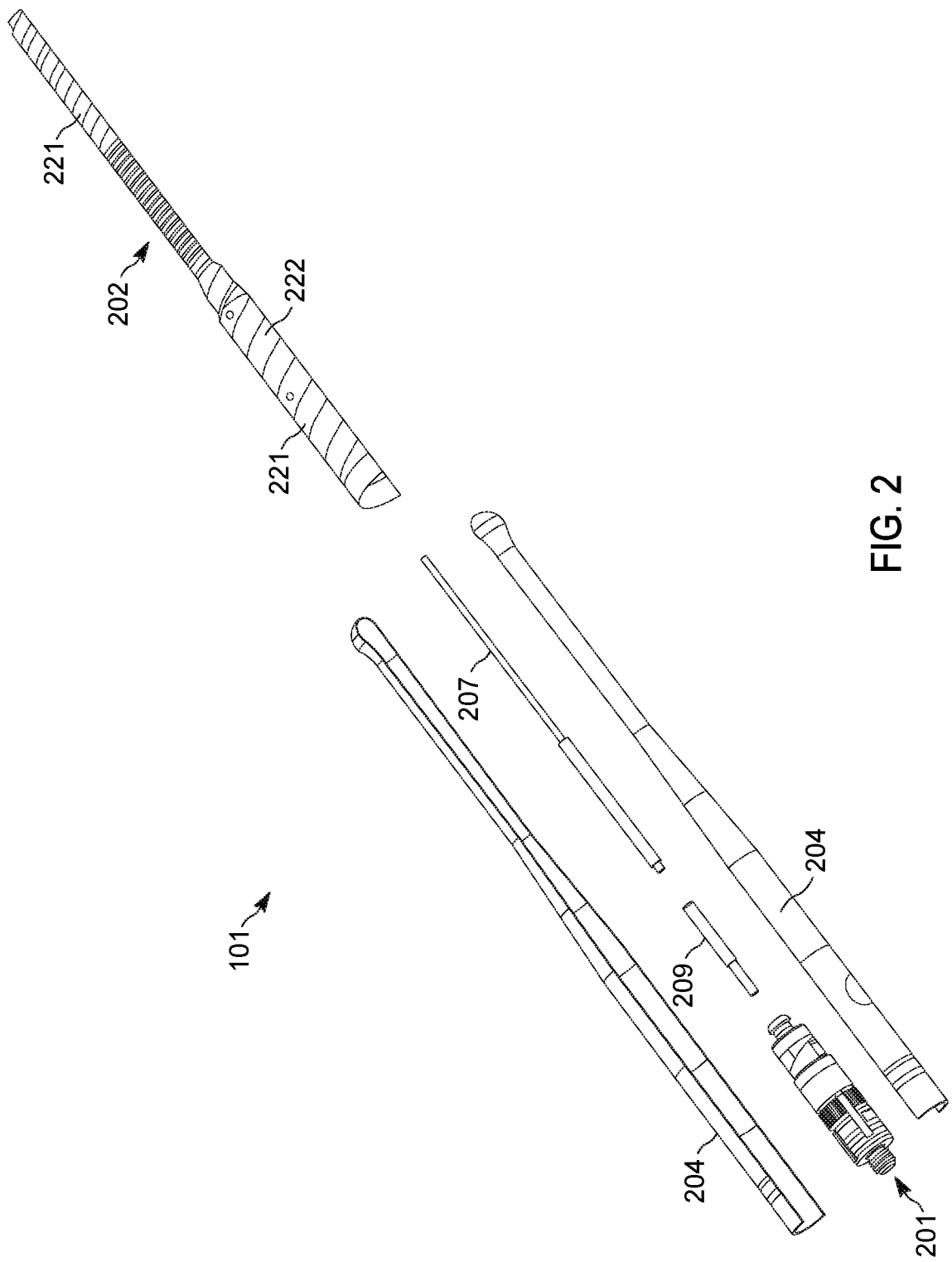
FIG. 2 is an exploded view of the antenna device of FIG. 1, in accordance with some examples.

Attention is next directed to FIG. 2 which depicts an exploded view of the antenna device 101. As depicted, the antenna device 101 comprises two units 201, 202, 209 and encased by an external sheath 204 (as depicted, split into two portions to show the units 201, 202 209 therein) to form the antenna device 101. As depicted, when the units 201, 202 are assembled, a floating antenna element 207 may be inserted into the unit 202, and spaced from the unit 201 via a spacer 209. Alternatively, the floating antenna element 207 and the spacer 209 may be incorporated into the unit 202 prior to assembly. However, the antenna device 101 may be provided and/or assembled in any suitable configuration.

The unit 201 generally comprises a base assembly of the antenna device 101, and the unit 202 generally comprises an antenna assembly of the antenna device 101. As will be explained hereafter, with regards to FIG. 3, the unit 201 generally comprises a removable matching circuit (e.g. a removable matching circuit 307 depicted in FIG. 3), and a removable shell (e.g. a removable shell 309 depicted in FIG. 3) which protects the matching circuit. The antenna device 101 and/or unit 202 generally comprises an antenna element 221 and a flexible form 222, As depicted, the antenna element 221 comprises a helical antenna element which is also flexible, and which is wrapped around the flexible form 222. The flexible form 222 may be made of silicone and/or liquid silicone rubber, and the antenna element 221 may be made from a flexible conducting material and/or a plurality of flexible conducting materials; for example, the antenna element 221 may include, but is not limited to, a flex antenna element.

As depicted in FIG. 2, the antenna device 101 and/or the unit 202 may comprise the floating antenna element 207, for example internal to the antenna element 221 (e.g. internal to the flexible form 222) and/or the helical antenna element, which is mechanically held in place in the flexible form 222 by the spacer 209, as described in more detail below. The spacer 209 generally comprises an insulator material and/or a dielectric material, including, but not limited to, Teflon™. In some examples, the spacer 209 may be a component of the unit 202.

While depicted as helical, the antenna element 221 may alternatively comprise a straight antenna element and/or a monopole antenna element and/or a folded monopole antenna element, and/or combination of a straight antenna element and a helical antenna element (e.g., the antenna element 221 may comprise one or more of a straight antenna element and a helical antenna element). Furthermore, the internal floating antenna element may be optional.

The antenna element 221 (e.g., together with, and/or separately from, the optional internal floating antenna element) may generally be configured to operate over a plurality of bands.

The external sheath 204 may comprise a thermo-plastic material, such as thermo-plastic polyurethane (TPU) which may be formed around the units 201, 202 (e.g., when the units 201, 202 are assembled including the floating antenna element 207 and the spacer 209). Hence, while the external sheath 204 is depicted as being two parts, the external sheath 204 may be formed in a unified manner.

Figure 3:
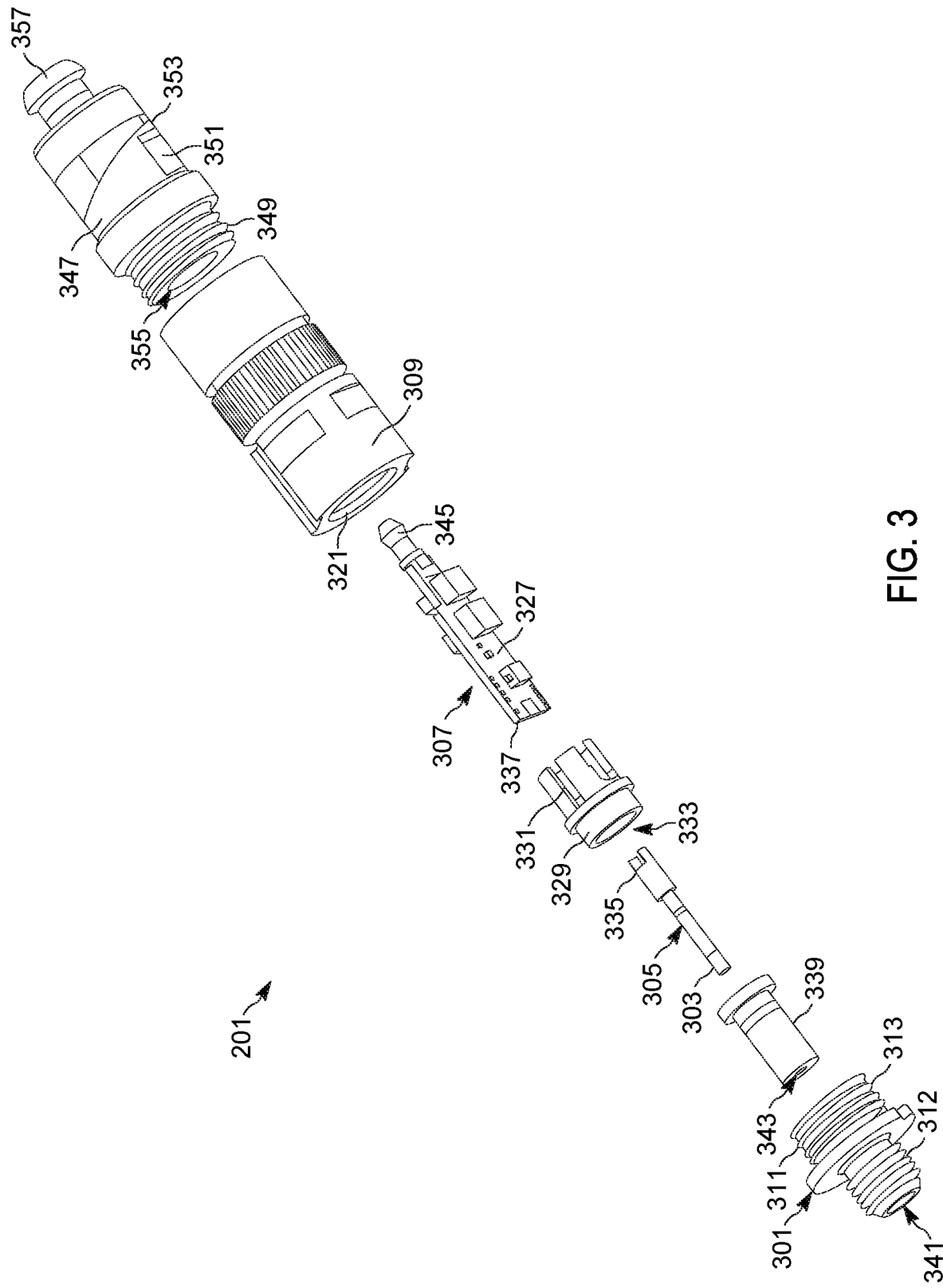
FIG. 3 is an exploded view of a portion of the antenna device of FIG. 1, in accordance with some examples.

Attention is next directed to FIG. 3 which depicts an exploded view of the unit 201. As depicted, the antenna device 101 and/or the unit 201 comprises a base 301; an electrical connector 303 at the base 301 (as depicted, the electrical connector 303 is integrated with a signal pin 305, described in more detail below); a matching circuit 307 removably positioned between the electrical connector 303 and the antenna element 221 (e.g., when the antenna device 101 is assembled), the electrical connector 303 and the antenna element 221 in electrical communication via the matching circuit 307 (e.g., when the antenna device 101 is assembled); and a shell 309 removably attached to the base 301 (e.g., when the antenna device 101 is assembled), the shell 309 surrounding and protecting the matching circuit 307.

As depicted, the base 301 comprises first threads 311 that extend towards the matching circuit 307 (and/or extend internally into the antenna device 101), and second threads 312 that extend away from the matching circuit 307. As depicted, the threads 311, 312 at the base 301 are separated by a circular lip and/or ledge 313 described in more detail below. For example, the base 301, including the threads 311, 312 and the circular lip and/or ledge 313 may be formed from metal as an integrated unit.

The shell 309 comprises complementary threads 321 that removably mate with the first threads 311 of the base 301, the shell 309 being removably attached to the base 301 via the complementary threads 321 and the first threads 311 of the base 301. Hence, for example, during assembly of the unit 201, the shell 309 may be screwed onto the base 301 via the threads 311, 321, and reside against an internal side of the circular ledge 313 when assembled.

The second threads 312 are generally configured to mate with the antenna receptacle 103 (e.g., at complementary threads of the antenna receptacle 103) at the communication device 100. Hence, for example, during attachment of the antenna device 101 to the communication device 100, the antenna device 101 may be screwed into the antenna receptacle 103 via the threads 312 (and complementary threads at the antenna receptacle 103) and the antenna receptacle 103 may reside against an external side of the circular ledge 313 when attached to the device 100.

As the base 301 may be conducting, and as the shell 309 may be conducting (e.g., formed from metal), the shell 309 may be electrically connected to the antenna receptacle 103 when the antenna device 101 is attached to the device 100, for example to ground the shell 309. As such, as will be explained in more detail below, when the shell 309 comprises metal, the shell 309 is generally electrically isolated from the antenna element 221, the electrical connector 303 and the matching circuit 307. Furthermore, the shell 309 is generally rigid and generally surrounds the matching circuit 307 to mechanically protect the matching circuit 307. In some examples, when the shell 209 is metal, and in particular a conducting metal (and/or a any suitable conducting material), the unit 202 may comprise a grounded antenna element connected to the shell 309, for example in a double helix arrangement with the depicted helical antenna element 221 (e.g. the grounded antenna also being helical, and electrically isolated from the helical antenna element 221).

For example, as depicted, the matching circuit 307 comprises a printed circuit board (PCB) 327 upon which radio-frequency (RF) matching electrical components of the matching circuit 307 are mounted. As the antenna element 221 may be configured to operate over a plurality of bands, when the antenna device 101 is attached to the device 100, the transceiver 105 may communicate via the antenna element 221 for example via the matching circuit 307, over a plurality of bands. Hence the matching circuit 307 may be generally configured to perform RF matching between the transceiver 105 and the antenna element 221 over the plurality of bands. As such, the PCB 327 may be longer, and hence more fragile than PCBs of matching circuits that are not configured to perform RF matching over a plurality of bands. The additional length may be due to the PCB 327 having to accommodate a large number of RF matching components of the matching circuit 307.

As the shell 309 is rigid, and generally surrounds the matching circuit 307, including the PCB 327, the shell 309 generally physically and/or mechanically protects the matching circuit 307, which may prevent the matching circuit 307 and/or the PCB 327 from being damaged during a fall test of the antenna device 101 and/or the device 100.

As depicted, the antenna device 101 and/or the unit 201 further comprises a receptacle 329 for removable receiving the PCB 327 when the shell 309 is removed from the base 301.

For example, as depicted, the receptacle 329 comprises one or more slots 331 (as depicted at least two slots 331) into which the PCB 327 may be removably received, for example when the shell 309 is removed from the base 301.

As depicted, the electrical connector 303 comprises a signal pin 305 extending through an aperture 333 in the receptacle 329. As depicted, the signal pin 305 is configured to removably mate with the matching circuit 307 when the PCB 327 is received at the receptacle 329 (e.g., in slots 331). As depicted, the signal pin 305 comprises a respective slot 335 which extends into the receptacle 329, for example between the slots 331, and into the which an end of the PCB 327 is removably received. In particular, an end of the PCB 327 which is received at the slot 335 includes an electrical connection 337 to the RF components of matching circuit 307, which electrically connects to the signal pin 305, and which electrically connects the matching circuit 307 to the electrical connector 303.

As depicted, sides of the PCB 327 may slide into the slots 331 of the receptacle 329, which may comprise metal and be electrically connected to the base 301 and/or the shell 309; hence, when a portion of the matching circuit 307 is to be grounded, the sides of the PCB 327 which slide into the slots 331 of the receptacle 329 may include electrical connectors to the portion of the matching circuit 307 to be grounded. In other examples, the sides of the PCB 327 which slide into the slots 331 may be insulating.

In general, the electrical connection 337 is in electrical communication with the transceiver 105 when the antenna device 101 is attached to the device 100; as such, the electrical connection 337 is generally electrically isolated from the electrical connectors to the portion of the matching circuit 307 that is to be grounded. As well the electrical connection 337 is generally electrically isolated from the receptacle 329, the base 301 and the shell 309.

Furthermore, as depicted, the antenna device 101 and/or the unit 201 further comprises an insulating spacer 339 which is received in an aperture 341 in the base 301 (e.g., at an internal side of the base 301). The spacer 339 includes a respective aperture 343 into which the signal pin 305 is received such that the electrical connector 303 and the signal pin 305 are electrically isolated from the base 301, when the antenna device 101 and/or the unit 201 is assembled, and which locates the electrical connector 303 at the base 301, for example at an external side of the aperture 341. Hence, when the antenna device 101 is attached to the device 100, the electrical connector 303 is electrically connected to the transceiver 105, while the base 301 is grounded. Put another way, the base 301 may be configured to mate with an antenna receptacle (e.g., the antenna receptacle 103) at a communication device (e.g., the device 101), and the electrical connector 303 may be configured to electrically communicate with a transceiver (e.g., the transceiver 105) of the communication device when the base 301 is mated with the antenna receptacle.

Figure 4:
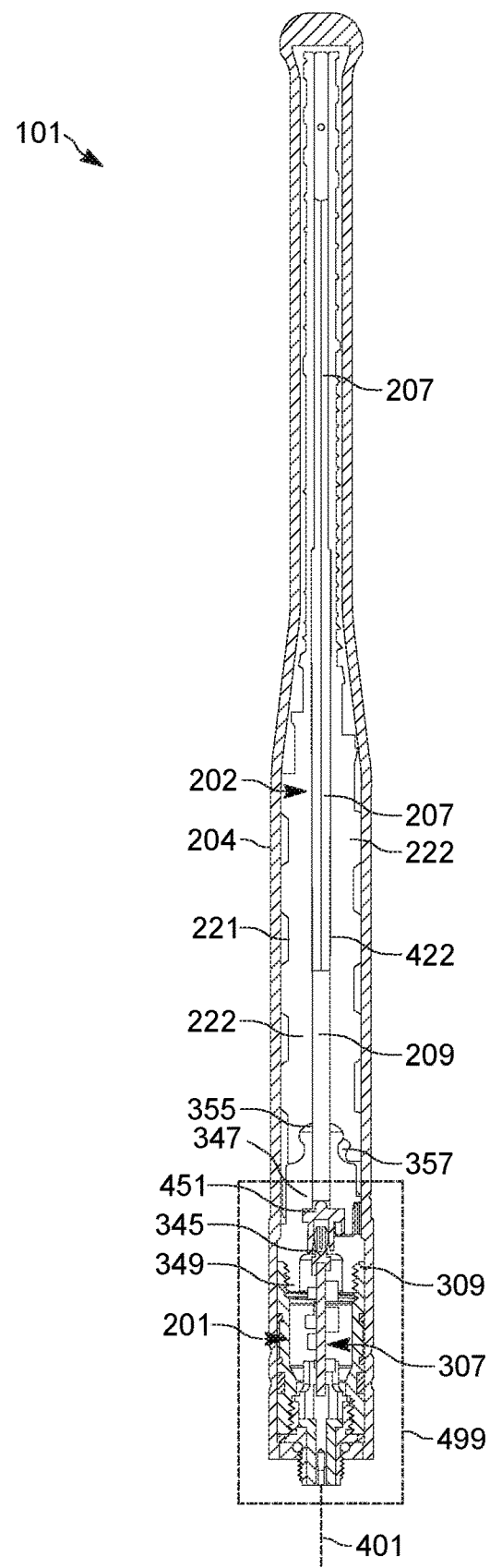
FIG. 4 is a cross-section of the antenna device, in accordance with some examples.
Figure 5:
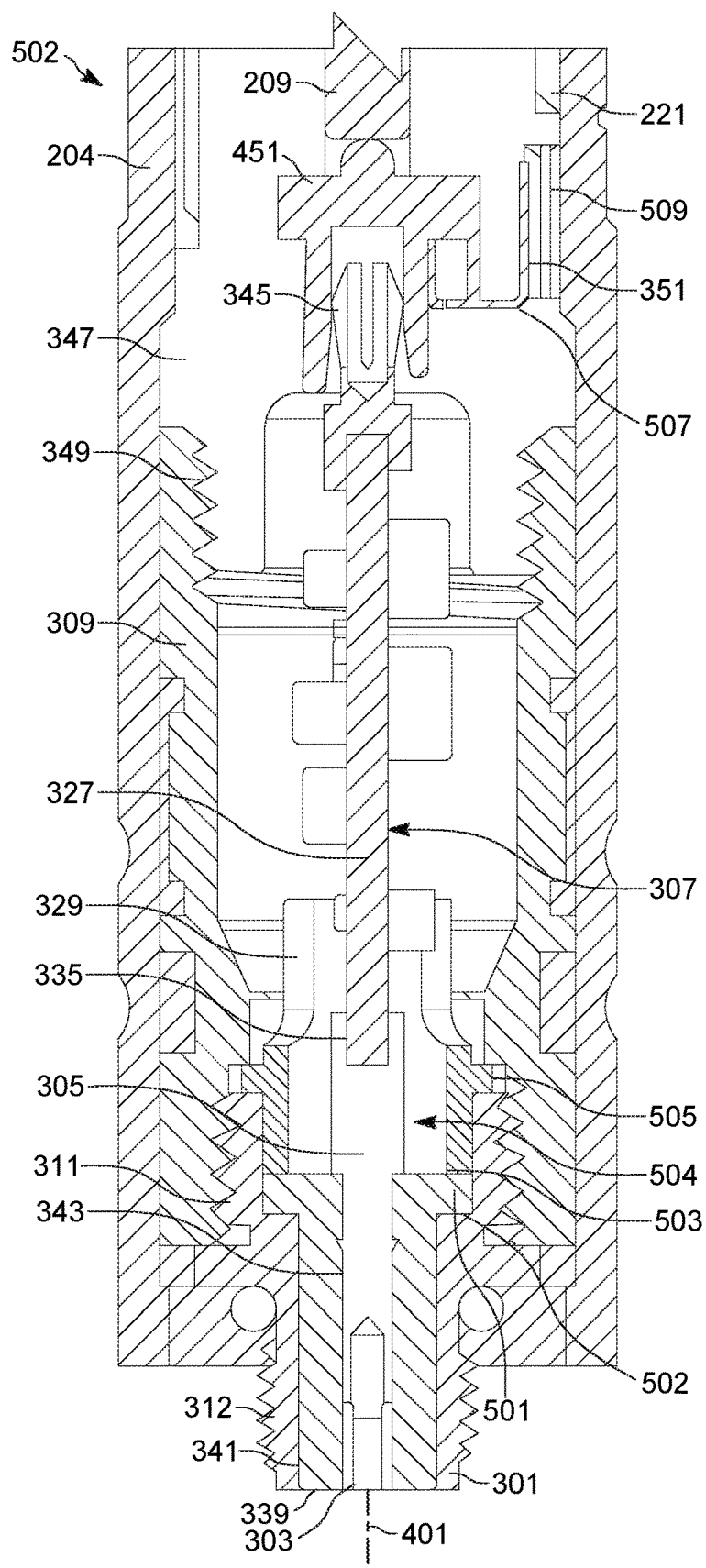
FIG. 5 depicts detail of the cross-section of the antenna device, in accordance with some examples Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

As depicted, the matching circuit 307 further comprises a respective signal pin 345 extending towards the antenna element 221 (e.g., when the antenna device 101 is assembled). As depicted, the signal pin 345 may extend from the PCB 327 at an end opposite of the end where the electrical connection 337 is located and/or where the PCB 327 is received in the slots 331 of the receptacle 329. As depicted, a head of the signal pin 345 comprises opposing biased portions, which may be compressed towards each other to mate with an electrically conducting receptacle that receives the respective signal pin 345, for example an electrically conducting receptacle 451 as best seen in FIG. 4 and FIG. 5, described below. Such an electrically conducting receptacle is generally configured to removably receive the respective signal pin 345, and is electrically connected to the antenna element 221, such that the respective signal pin 345 and the antenna element 221 are electrical communication via the electrically conducting receptacle.

As depicted, the antenna device 101 and/or the unit 201 further comprises a dielectric component 347 configured to removably mate with, and/or removably attach to, the shell 309, for example via threads 349 located at a shell end of the dielectric component 347. The threads 349 removably mate with complementary threads (not visible in FIG. 3) at an internal surface of the shell 309. Hence, the dielectric component 347 may be removably attached to the shell 309, for example prior to, or after, the shell is attached to the base 301. Indeed, the dielectric component 347 is generally removably attachable to the shell 309 at an end opposite the base 301.

As described below, but not visible in FIG. 3, the dielectric component 347 comprises: an electrically conducting receptacle therein configured to removably mate with, and electrically connect to, the matching circuit 307, for example via the respective signal pin 345. In general, the matching circuit 307 and the antenna element 221 are in electrical communication via the electrically conducting receptacle internal to the dielectric component 347.

In particular, as depicted in FIG. 3, the dielectric component 347 may further comprise an electrical contact 351 at an external surface 353, the electrical contact 351 in electrical communication with the electrically conducting receptacle therein and a respective end of the antenna element 221 (e.g., when the antenna device 101 is assembled), such that the matching circuit 307 and the antenna element 221 are in electrical communication via the electrically conducting receptacle and the electrical contact 351. For example, the respective signal pin 345 may connect to the electrically conducting receptacle internal to the dielectric component 347 (for example via an aperture 355 in the dielectric component 347 at the end which attaches to the shell 309), which is electrically connected to the electrical contact 351, which electrically connects to an end of the antenna element 221.

Hence, the dielectric component 347 includes electrical connections used to connect the matching circuit to the antenna element 221, while electrically insulating the electrical connections and the antenna element 221 from the shell 309.

However, the dielectric component 347 may further act as a partially flexible mechanical interface between the rigid shell 309 and the flexible components of the unit 202. For example, as depicted in FIG. 3, the dielectric component 347 further comprises, at an antenna end, opposite a shell end of the dielectric component 347, a mechanical connector 357 which mates with the flexible form 222. The dielectric component 347 may comprise a material with rigidity between that of the shell 309 and the flexible form 222.

For example, attention is next directed to FIG. 4 which depicts a cross-section of the antenna device 101, as assembled, the depicted cross-section being through a longitudinal axis 401 thereof. In particular, FIG. 4 depicts the units 201, 202 assembled via the flexible form 222 mating with the mechanical connector 357 of the dielectric component 347. For example, at a mechanical connection end, the flexible form 222 comprises a receptacle complementary to a mushroom shape of the mechanical connector 357, and which receives and/or fits over the mechanical connector 357, the flexible form 222 being frictionally retained by the mechanical connector 357. However, the mechanical connector 357 and the mechanical connection end, the flexible form 222 may be any suitable respective shapes that connect and, and the like.

In general, the dielectric component 347 is attached to, and resides between, the shell 309 and the flexible form 222 (and/or the antenna element 221, which is also flexible in the depicted examples). Indeed, as depicted in FIG. 4, the dielectric component 347 has been attached to the shell 309 via the threads 349 and complementary threads at the shell 309; furthermore, the flexible form 222 has been attached to the dielectric component 347. Hence, in general, the dielectric component 347 may be configured to: removably mate with the shell 309; and removably mate with the flexible form 222 of the antenna element 221. Furthermore, the shell 309 (e.g., made of metal) may be more rigid that the dielectric component 347 (e.g., made of plastic), and the dielectric component 347 may be more rigid than the flexible form 222 (e.g., made of silicone and/or liquid silicone rubber, and the like).

FIG. 4 further depicts the floating antenna element 207 internal to the antenna element 221. For example, the floating antenna element 207 may comprise a monopole antenna element and/or a folded monopole floating antenna element located internal to the flexible form 222. For example, the flexible form 222 is generally insulating and includes an internal channel 422 along the longitudinal axis 401 into which the floating antenna element 207 may be inserted to form the unit 202. The floating antenna element 207 is not in galvanic electrical connection to other electrical components of the antenna device 101 but may be capacitively connected to other electrical components of the antenna device 101, including, but not limited to, the antenna element 221. The presence of the floating antenna element 207 may favorably affect a radiation pattern of the antenna device 101.

FIG. 4 further depicts the spacer 209 located in the internal channel 422. FIG. 4 further depicts the electrically conducting receptacle 451 of the dielectric component 347, located at an interior of the dielectric component 347 and which receives the signal pin 345 of the matching circuit 307. In general, one end of the spacer 209 extends from the internal channel 422, through the aperture 355 of the dielectric component 347 (e.g., through the mechanical connector 357) and resides against the electrically conducting receptacle 451, which may be generally cylindrical in shape and centered on the internal channel 422 and/or the aperture 355. An opposite end of the spacer 209 is located at a respective end of the floating antenna element 207, and generally locates the floating antenna element 207 at a distance of about the length of the spacer 209 from the electrically conducting receptacle 451, and further locates the floating antenna element 207 relative to the antenna element 221. The length of the spacer 209 may be selected to locate the floating antenna element 207 relative to the antenna element 221 so as to favorably affect a radiation pattern of the antenna device 101.

Attention is next directed to FIG. 5 which depicts details of a box 499 of the cross-section depicted in FIG. 4. In particular, FIG. 5 depicts details of the electrical connections of the antenna device 101 when assembled, as well as details of some aspects of the mechanical assembly of the unit 201.

FIG. 5 depicts the insulating spacer 339 as inserted into the aperture 341 and in particular a lip 501 of the insulating spacer 339 resides on an internal ledge 502 of the base 301 to hold the insulating spacer 339 in the aperture 341. Similarly, the signal pin 305 is inserted into the aperture 343 of the insulating spacer 339, with a lip 503 of the signal pin 305 held in place by the lip 501 of the insulating spacer 339, which forms an external ledge against which the lip 503 resides. The signal pin 305 is of a length that locates the electrical connector 303 at the base 301 so that the electrical connector 303 may electrically connect with a complementary electrical connector at the antenna receptacle 103, and hence to the transceiver 105, when the antenna device 101 is attached to the device 100.

FIG. 5 further depicts the PCB 327 of the matching circuit 307 being removably held in place by the slot 335 of the signal pin 305 and the electrically conducting receptacle 451. For example, as depicted, the signal pin 345 is removably inserted into the electrically conducting receptacle 451 and opposing biased portions of the signal pin 305 are compressed towards each other to mate with the electrically conducting receptacle 451.

Indeed, the signal pin 345 may rotate within the electrically conducting receptacle 451; furthermore the receptacle 329, which resides against the insulating spacer 339, may also rotate against the insulating spacer 339, and similarly the signal pin 305, which is electrically separated from the receptacle 329 by an air gap 504, may also rotate against the insulating spacer 339. For example, an external lip 505 of the receptacle 329 may further reside against an end of the base 301 and rotate against the end of the base 301 as well as against the insulating spacer 339. As such, the components holding the PCB 327 in place in the antenna device 101 may all rotate, which may allow the PCB 327 to rotate, while maintaining electrical connects with the electrical connector 303 and the electrically conducting receptacle 451. Such an arrangement may relieve rotational stress on the matching circuit 307 and/or the PCB 327 when torque and/or a twisting motion is used to tighten or loosen the antenna device 101 at the antenna receptacle 103.

FIG. 5 further depicts the electrical connection between the signal pin 345 and the antenna element 221. For example, FIG. 5 shows that the electrical contact 351 is electrically connected to the electrically conducting receptacle 451 at which the signal pin 345 is received, for example via one or more electrical connections 507 internal to the dielectric component 347. As depicts, an electrically conducting end 509 of the antenna element 221 contacts the electrical contact 351, which electrically connects the signal pin 345, and hence the matching circuit 307 to the antenna element 221 via the electrically conducting receptacle 451, the one or more electrical connections 507 and the electrical contact 351.

In general, the antenna device 101 may be partially assembled by assembling the units 201, 202 together with the spacer 209. The matching circuit 307 of the antenna device 101 may be electrically tested, for example in a factory setting. If the matching circuit 307 does not pass a test, the antenna device 101 may be easily disassembled by first disassembling the units 201, 202, and then disassembling the unit 201. The unit 201 may be disassembled by unscrewing the shell 309 from the base 301 and optionally unscrewing the dielectric component 347 from the shell 309. When the unit 201 is disassembled, signal pin 345 is removed from the electrically conducting receptacle 451, and the matching circuit 307 and the PCB 327 may be removed from the slots 331, 335 and replaced with another matching circuit on a respective PCB. The unit 201 may be reassembled with the replacement matching circuit and PCB, and reassembled with the unit 202, and the spacer 209, for further electrical testing. Once the antenna device 101 passes the electrical testing, the external sheath 204 may be formed on the units 201, 202 using thermoplastic forming techniques such that the external sheath 204 contains at least the antenna element 221, the electrical connector 303, the matching circuit 307 and the shell 309, as well as other components internal to the antenna device 101 as described herein; the external sheath 204 is formed in such a manner such that the threads 312 are not covered, and the electrical connector 303 is electrically accessible via the aperture 341.

While the antenna device 101 is described herein as being assembled in a particular example, and similarly components of the antenna device 101 are described as being removably attachable to each other via particular mechanisms (e.g. threads), such as threads, the antenna device 101 may be assembled in any suitable manner and further the components of the antenna device 101 that are removably attachable to each other may be removably attachable via any suitable mechanism. For example, one or more of the components of the antenna device 101 that are removably attachable may be removably attachable via any suitable fasteners (e.g. flexible tabs that removably mate with complementary ridges, retractable buttons that removably mate with complementary apertures, and the like).

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

In this document, language of "at least one of X, Y, and Z" and "one or more of X, Y and Z" may be construed as X only, Y only, Z only, or any combination of two or more items X, Y, and Z (e.g., XYZ, XY, YZ, XZ, and the like). Similar logic may be applied for two or more items in any occurrence of "at least one . . . " and "one or more . . . " language.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. An antenna device comprising:
   a base;
   an antenna element;
   an electrical connector at the base;
   a matching circuit removably positioned between the electrical connector and the antenna element, the electrical connector and the antenna element in electrical communication via the matching circuit; and
   a metal shell removably attached to the base, the metal shell surrounding and protecting the matching circuit,
   wherein the base comprises threads that extend towards the matching circuit, and the metal shell comprises complementary threads that removably mate with the threads of the base, the metal shell being removably attached to the base via the complementary threads and the threads of the base, and
   wherein the metal shell is formed from metal, the metal shell being electrically isolated from the antenna element, the electrical connector and the matching circuit.

2. The antenna device of claim 1, wherein the base further comprises second threads that away from the matching circuit, the second threads configured to mate with an antenna receptacle at a communication device.

3. The antenna device of claim 1, wherein the matching circuit comprises a printed circuit board (PCB), and the antenna device further comprises a receptacle for removable receiving the PCB when the metal shell is removed from the base.

4. The antenna device of claim 3, wherein the electrical connector comprises a signal pin extending through an aperture in the receptacle, the signal pin configured to removably mate with the matching circuit when the PCB is received at the receptacle.

5. The antenna device of claim 1, wherein the matching circuit comprises a respective signal pin extending towards the antenna element, the antenna device further comprising an electrically conducting receptacle configured to removably receive the respective signal pin, the respective signal pin and the antenna element in electrical communication via the electrically conducting receptacle.

6. The antenna device of claim 1, further comprising a dielectric component configured to: removably mate with the metal shell; and removably mate with a flexible form of the antenna element.

7. The antenna device of claim 6, wherein the metal shell is more rigid that the dielectric component, and the dielectric component is more rigid than the flexible form.

8. The antenna device of claim 6, wherein the dielectric component comprises: at a shell end, respective threads which removably mate with respective complementary threads at the metal shell; and, at an antenna end opposite the shell end, a mechanical connector which mates with the flexible form.

9. The antenna device of claim 1, further comprising a dielectric component configured to removably mate with the metal shell, the dielectric component comprising: an electrically conducting receptacle therein configured to removably mate with, and electrically connect to, the matching circuit, the matching circuit and the antenna element in electrical communication via the electrically conducting receptacle.

10. The antenna device of claim 9, wherein the dielectric component further comprises an electrical contact at an external surface, the electrical contact in electrical communication with the electrically conducting receptacle therein and the antenna element, such that the matching circuit and the antenna element are in electrical communication via the electrically conducting receptacle and the electrical contact.

11. The antenna device of claim 1, wherein the base is configured to mate with an antenna receptacle at a communication device, and the electrical connector is configured to electrically communicate with a transceiver of the communication device when the base is mated with the antenna receptacle.

12. The antenna device of claim 1, wherein the antenna element comprises one or more of a straight antenna element and a helical antenna element.

13. The antenna device of claim 1, wherein the antenna element comprises a floating antenna element internal to the antenna element.

14. The antenna device of claim 1, wherein the antenna element comprises a helical antenna element, and the antenna device further comprises a floating antenna element internal to the helical antenna element.

15. The antenna device of claim 1, further comprising an external sheath which contains at least the antenna element, the electrical connector, the matching circuit and the metal shell.

16. The antenna device of claim 1, further comprising:
   a first signal pin extending from the electrical connector to the matching circuit, the first signal pin comprising a slot configured to removably mate with a printed circuit board (PCB) of the matching circuit; and
   a second signal pin extending from the matching circuit towards the antenna element, the second signal pin configured for removable insertion into an electrically conducting receptacle of the antenna element.

17. The antenna device of claim 1, further comprising:
   a receptacle between the electrical connector and the matching circuit, the receptacle comprising one or more slots configured to removably receive a printed circuit board (PCB) of the matching circuit.

18. The antenna device of claim 1, further comprising:
   a receptacle between the electrical connector and the matching circuit, the receptacle comprising one or more first slots configured to removably receive a printed circuit board (PCB) of the matching circuit;
   a first signal pin extending from the electrical connector to the matching circuit,
   the first signal pin comprising a second slot which extends into the receptacle between the one or more first slots, the second slot configured to removably mate with the printed circuit PCB of the matching circuit, wherein an end of the PCB that receives the second slot includes an electrical connection to radio-frequency (RF) components of the matching circuit, which electrically connects the matching circuit to the electrical connector via the second slot; and a second signal pin extending from the matching circuit towards the antenna element, the second signal pin configured for removable insertion into an electrically conducting receptacle of the antenna element.

19. A portable communication device comprising:

a housing; a transceiver; an antenna receptacle; and an antenna device comprising:

a base removably attached to the antenna receptacle;

an antenna element;

an electrical connector at the base, the electrical connector in communication with the transceiver;

a matching circuit removably positioned between the electrical connector and the antenna element, the electrical connector and the antenna element in electrical communication via the matching circuit; and a metal shell removably attached to the base, the metal shell surrounding and protecting the matching circuit, wherein the base comprises threads that extend towards the matching circuit, and the metal shell comprises complementary threads that removably mate with the threads of the base, the metal shell being removably attached to the base via the complementary threads and the threads of the base, and wherein the metal shell is formed from metal, the metal shell being electrically isolated from the antenna element, the electrical connector and the matching circuit.

\* \* \* \* \*

UNITED STATES PATENT AND TRADEMARK OFFICE
CERTIFICATE OF CORRECTION

PATENT NO. : 10,992,036 B2
APPLICATION NO. : 16/515595
DATED : April 27, 2021
INVENTOR(S) : Peter Christopher Jan It is certified that error appears in the above-identified patent and that said Letters Patent is hereby corrected as shown below:

In the Claims

Column 11, Line 43, Claim 2, after the word "that" and before the word "away" add the word --extended--.

Column 12, Line 2, Claim 7, before the word "rigid" remove the word --that-- and add after the word "rigid" the word --than--.

Signed and Sealed this
Thirtieth Day of August, 2022

Katherine Kelly Vidal
*Director of the United States Patent and Trademark Office*